US006004253A

United States Patent [19]

Riedel et al.

[11] Patent Number: 6,004,253

[45] Date of Patent: Dec. 21, 1999

[54] MEDICAL ADHESIVE BANDAGE MANUFACTURING

[75] Inventors: John E. Riedel; Clarence A. Niven, Jr., both of St. Paul, Minn.

[73] Assignee: 3M Innovative Properties Company, St. Paul, Minn.

[21] Appl. No.: 08/950,519

[22] Filed: Oct. 14, 1997

Related U.S. Application Data

[63] Continuation of application No. 08/442,823, May 17, 1995, abandoned.

[51] Int. Cl.$^{6}$ .......... B32B 31/04

[52] U.S. Cl. .......... 493/340; 242/548; 493/388

[58] Field of Search .......... 493/340, 343, 493/344–349, 353, 365, 369–370, 374, 379, 380–383, 386, 388; 242/535, 538.2, 548, 566

[56] References Cited

U.S. PATENT DOCUMENTS

| | | | |
|---|---|---|---|
| 1,745,467 | 2/1930 | Barber . | |
| 1,911,291 | 5/1933 | Reynolds . | |
| 2,137,978 | 11/1938 | Mills et al. | 270/37 |
| 2,531,913 | 11/1950 | Kaim | 242/75 |
| 2,660,115 | 11/1953 | Ras | 101/248 |
| 2,890,002 | 6/1959 | Thomas | 242/75.4 |
| 3,098,434 | 7/1963 | Lime | 101/178 |
| 3,383,991 | 5/1968 | Sarka | 93/58.2 |
| 3,745,893 | 7/1973 | Helm et al. | 493/343 X |
| 3,869,964 | 3/1975 | Kranz | 493/343 X |
| 3,900,027 | 8/1975 | Keedwell | 128/268 |
| 3,957,570 | 5/1976 | Helm | 156/519 |
| 4,116,401 | 9/1978 | Evert et al. | 242/68.3 |
| 4,309,804 | 1/1982 | Sarka | 29/407 |
| 4,312,470 | 1/1982 | Hope et al. | 226/183 |
| 4,397,704 | 8/1983 | Frick | 156/201 |
| 4,622,089 | 11/1986 | Lauritzen | 156/250 |
| 4,820,249 | 4/1989 | Wech | 493/192 |
| 4,854,983 | 8/1989 | Bryniarski et al. | 56/70 |
| 4,977,728 | 12/1990 | Rambold | 53/567 |

(List continued on next page.)

FOREIGN PATENT DOCUMENTS

| | | |
|---|---|---|
| 0 433 575 | 6/1991 | European Pat. Off. . |
| 0 451 705 | 10/1991 | European Pat. Off. . |
| 2.362.727 | 3/1978 | France . |
| 32 03 992 | 8/1983 | Germany . |
| 86 06 662 U | 5/1986 | Germany . |
| WO 94/21207 | 9/1994 | WIPO . |

OTHER PUBLICATIONS

"Control Systems for Web–Fed Machinery", H.L. Weiss, Converting Technology Company, Milwaukee, WI (Aug. 11, 1993), pp. 27–30, 43–50, 133–134 and 313–318.

(List continued on next page.)

*Primary Examiner*—David A. Scherbel
*Assistant Examiner*—Anthony Ojini
*Attorney, Agent, or Firm*—Gary L. Griswold; Eloise J. Maki; Stephen W. Bauer

[57] ABSTRACT

A machine and method for converting a web having an indefinite length which includes a plurality of converting stations circumferentially spaced about an process drum. At least one of the converting stations includes a helical follower gear operatively meshing with a helical drive gear attached to the process drum. Movement of the follower gear along its axial direction provides for the relative rotational registration of a tool on the registrable converting station relative to the web.

18 Claims, 11 Drawing Sheets

U.S. PATENT DOCUMENTS

| | | | |
|---|---|---|---|
| 5,017,184 | 5/1991 | Takahori et al. | 493/368 |
| 5,160,098 | 11/1992 | Durkos | 242/75.51 |
| 5,207,855 | 5/1993 | Nyfeler et al. | 156/351 |
| 5,403,267 | 4/1995 | Pearce et al. | 602/8 |
| 5,490,639 | 2/1996 | Droutsas | 242/525.1 |
| 5,531,855 | 7/1996 | Heinecke et al. | 156/252 |

OTHER PUBLICATIONS

CTC Product brochure entitled: CTC Web Accumulators (Festoon)(Aug. 1989).

CTC Product brochure entitled: "Model ST–200RW3–22 Three Spindle Semi–Automatic Turret Rewinder" (1992 or earlier).

CTC Product brochure entitled: "CTC Single and Dual Arbor Rewinders" (Aug. 1989).

CTC Product brochure entitled: "Unwind Tension Control Systems" (Aug. 1987).

CTC Product brochure entitled: "CTC Series III Automatic Butt Splicers" (1992 or earlier).

CTC Product data sheet for quotation entitled: "Rewind Systems (other than Automatic Turret Rewinders)" (Sep. 1991).

CTC Product data sheet for quotation entitled: "Unwind Tension Control Units" (Jan. 1989).

CTC Product data sheet for quotation entitled: "Automatic Splicers" (Jan. 31, 1989).

CTC Product brochure entitled: "CTC Packaging & Converting Applications of Unwind Tension Compensators" (1992 or earlier).

CTC Product brochure entitled: "CTC Edge Guiding for Cantilever Type Unwind & Rewind Systems" (1992 or earlier).

CTC Product brochure entitled: "Constant Tension Unwind Stands" (Aug. 1987).

CTC Product brochure entitled: "Precision Rollers for Web Converting Applications" (1992 or earlier).

CTC Product brochure entitled: "Automatic Turret Rewinders" (1992 or earlier).

CTC Product brochure entitled: "Automatic Splicers" (Aug. 1989).

CTC Product brochure entitled: "Automatic Splicing Mechanisms and Logic Controls" (1992 or earlier).

CTC Product brochure entitled: "Variations of CTC Splicers" (Aug. 1989).

JRC Products, Inc. Product brochure entitled: "Air Chucks & Shafts" (1992 or earlier).

JRC Products, Inc. Product brochure entitled: "Application Engineered Air Chucks & Shafts" (Feb. 1991).

JRC Products, Inc. Product brochure entitled: "JRC Quick–Locking Mechaanical Chucks & Shafts" (Sep. 1986).

Untitled CTC Product brochure labeled "A1," (1992 or earlier).

"Changing Market Speeds Trend to Rotary Die Cutting", Bernal Rotary Cutting Technologies; Steven Graphics, 4 pgs. (Undated).

"Introducing our new rotary shaftless cutting system with P.S. Modules and R. S. Dies", Bernal Rotary Cutting Technologies; Stevens Graphics, 2 pgs. (Undated).

"Proven cutting technology for folding carton and specialty applications", Bernal RP Rotary Cutters; Stevens Graphics, 4 pgs. (Undated).

"The broadest line of rotary cutting equipment available", Bernal Rotary Cutting Technologies; Stevens Graphics, 8 pgs. (Undated).

*Fig. 12*
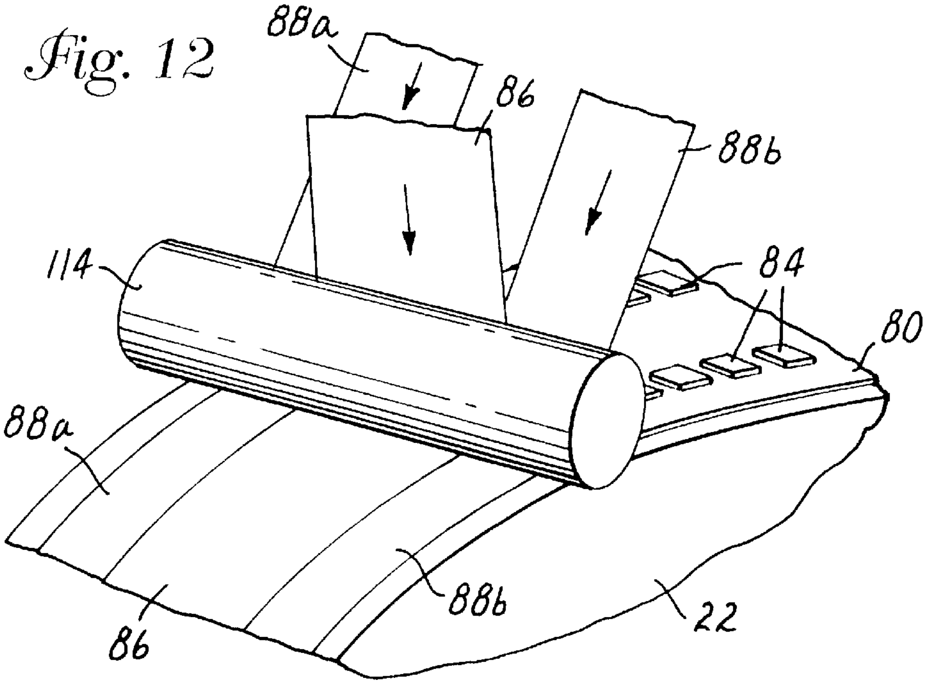
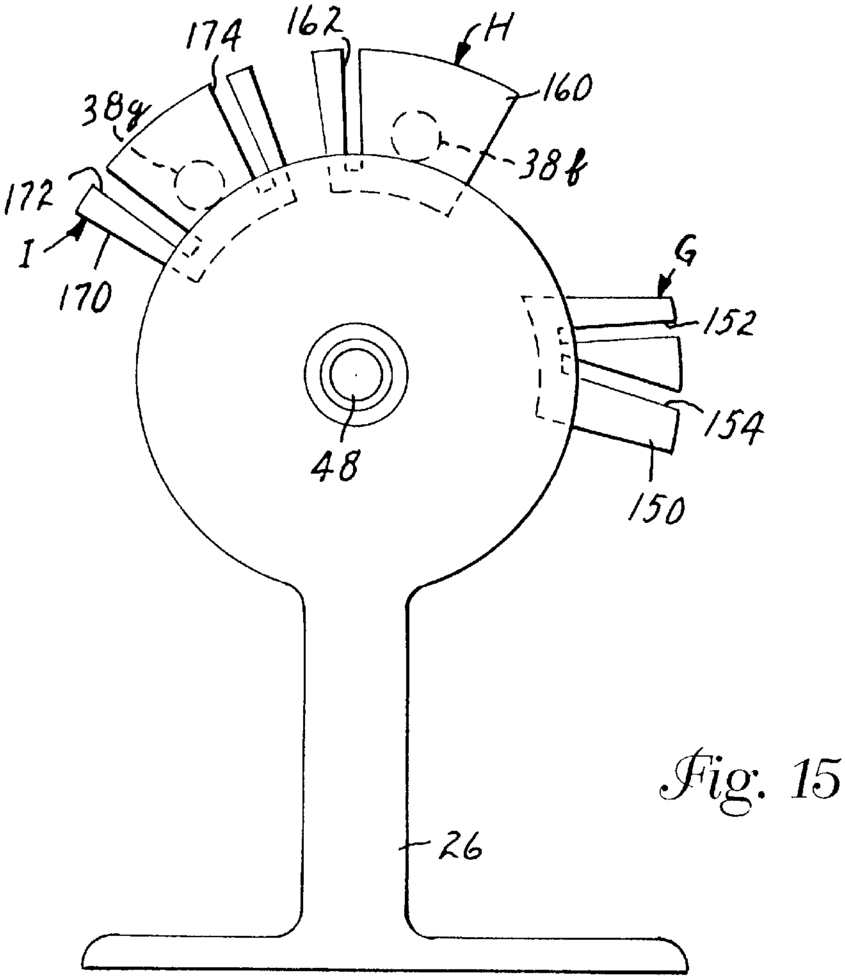
*Fig. 15*

MEDICAL ADHESIVE BANDAGE MANUFACTURING

RELATED APPLICATIONS

The present application is a continuation of U.S. patent application Ser. No. 08/442,823, filed on May 17, 1995 now abandoned, which is hereby incorporated by reference in its entirety.

FIELD OF THE INVENTION

The present invention relates to a machine for converting a web. More particularly, the present invention relates to a machine and method for converting a web which includes a single process drum around which a plurality of converting stations are located, at least one of the stations being registrable through movement of intermeshing helical gears.

BACKGROUND OF THE INVENTION

The high speed conversion of materials in continuous web form is well known. Such "converting" processes include die cutting, slitting, sheeting and placement of components on a moving web. Traditionally, each converting step is carried out at a different location or converting station located along a linear piece of production equipment. As used herein the terms "continuous web" and "web having an indefinite length" refer to webs that have a length sufficiently great relative to converting machine and process that for a reasonable period of time the web does not have an end passing through the converting machine or process.

One problem with converting equipment is controlling registration along the web between stations which are performing converting steps on the web. Registration has been achieved by using individual drives at each converting station which are controlled electronically to maintain both registration with respect to the converting steps as well as proper web tension between stations. Such systems are, however, typically expensive and may require elaborate programming to maintain proper web tension and registration between stations.

Earlier designs of converting equipment relied on mechanical registration between stations by providing a central driveshaft which was used to drive individual stations located in a linear arrangement. The length of such systems resulted in an accumulation of tolerances along the driveshaft. As a result, it was difficult to maintain those systems in registration because of the tendency of the machine to drift out of registration due to the variations induced by those tolerances. Furthermore, the mechanical registration drive control systems also suffered from a lack of independent registration control at each of the converting stations. In addition, where tension control was important, such systems required relatively elaborate and expensive tension controls including nip rolls and tension rolls.

The problems of controlling both registration and tension with any converting system are substantially increased when converting elastic and/or delicate web materials which are much more sensitive to tension variations than more stable web materials. Lack of tension control and corresponding registration problems make such materials difficult to convert and result in high waste and low productivity.

Another disadvantage of linear web converting lines, whether relying on electrical or mechanical registration control, is that they require relatively large amounts of floor space for converting processes which increases the cost of goods produced using the converting lines.

U.S. Pat. No. 4,854,983 to Bryniarski et al. discloses a method of heat sealing a web by directing it over a central roll around which a plurality of nip rolls are placed. The central roll is preferably heated at certain areas to affect heat sealing of the plastic web material in the transverse web direction. Although this design does disclose a series of nip rolls circumferentially spaced around a central roll, there is no discussion regarding registration problems because the nip rolls do not perform converting operations which require registration. Instead, heat sealing is performed by heated sections on the central roll, around which spacing is constant.

U.S. Pat. No. 5,017,184 to Takahori et al. discloses a single converting station design in which rotary registration is accomplished between a tool roll and an anvil roll through the movement of helical gears to effect a relative rotation between the tool roll and anvil roll. This system is not, however, deployed on the circumference of a central anvil roll along with other converting steps requiring registration.

SUMMARY OF THE INVENTION

The present invention provides a rotary converting machine for converting a web having an indefinite length which includes a plurality of converting stations circumferentially spaced about a process drum. At least one of the converting stations includes a helical follower gear operatively meshing with a helical drive gear attached to the process drum. Movement of the follower gear along its axial direction provides for the relative rotational registration of a tool on the registrable converting station relative to the web.

One advantage of the present invention is the ability to independently control registration between a plurality of converting stations spaced circumferentially about a single process drum. As a result, a plurality of converting steps can be accomplished in a very limited amount of floor space needed to support the central process drum.

Another advantage of the present invention includes the ability to precisely control the speed of driven rolls to match the speed of the central process drum. Because the web is threaded around and maintains contact with the central process drum, and any rolls driven from the main gear precisely match the speed of the central process drum, rotary drum converters according to the present invention are particularly well-suited for converting webs which are elastic and/or delicate because the converting processes can be performed at tension levels at or near zero.

A further advantage of the present invention is that control over registration is separated from control over web speed and the speed of the rolls driven from the main gear. As a result, once the registration between converting stations is adjusted, the speed of the machine can be varied without upsetting registration.

These and other features and advantages of the present invention will become apparent upon a reading of the specification detailed description of the invention which follow.

BRIEF DESCRIPTION OF THE DRAWINGS

FIG. 12 is an enlarged view of one converting step in the process depicted in FIG. 9.

FIG. 15 is a schematic diagram of a machine according to the present invention including a variety of different converting station side plates.

DETAILED DESCRIPTION OF PREFERRED EMBODIMENTS

Figure 2:
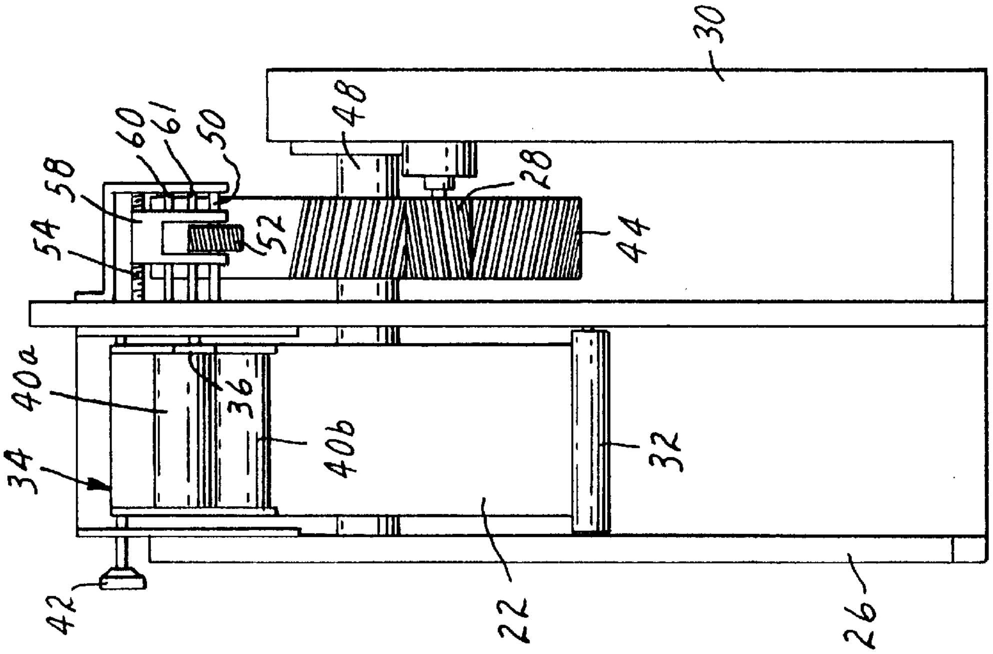
FIG. 2 is a view of the machine of FIG. 1 taken along the web travel direction.
Figure 1:
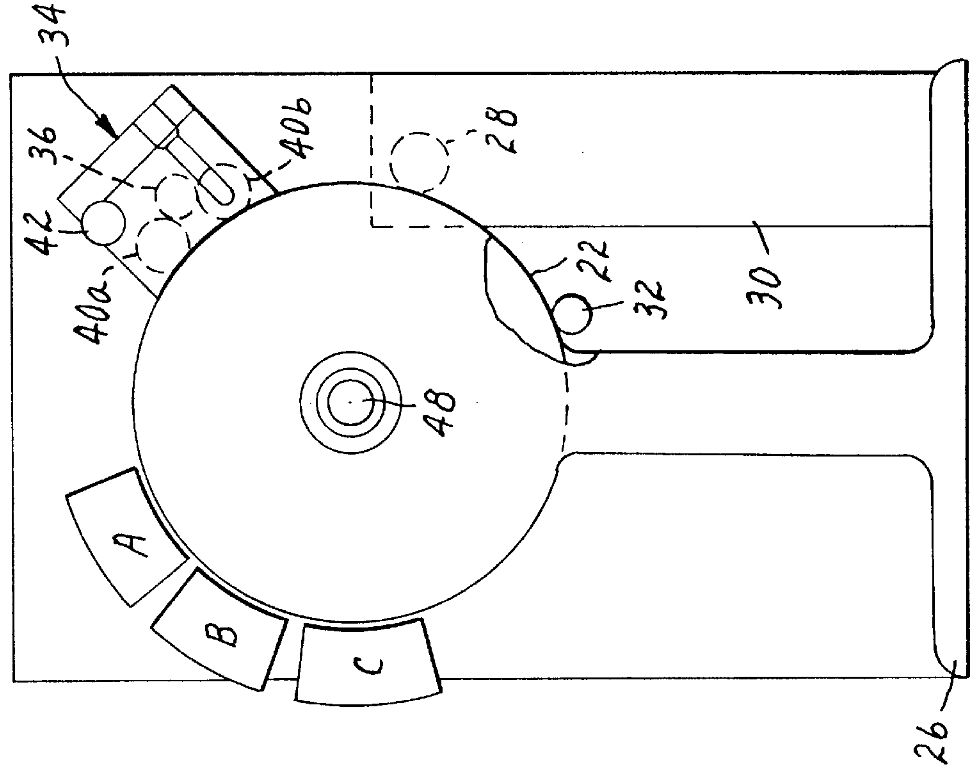
FIG. 1 is a side view in partial cross section of one machine according to the present invention.

One preferred embodiment of a rotary converting machine according to the present invention is depicted in FIGS. 1 & 2. As shown, a central process drum 22 is rigidly mounted on primary axle 48. Axle 48 is rotatably mounted on support 26 as best shown in FIG. 1. Helical main gear 44 is also rigidly mounted on the primary axle 48 to ensure that the helical main gear 44 and the process drum 22 rotate in synchrony. A motor in housing 30 rotates pinion 28, which drives main gear 44 which, in turn, rotates process drum 22.

One or more driven nip rolls 32 are optionally provided for applications where it is necessary to convert webs which are elastic and/or delicate. Such materials typically cannot withstand significant amounts of tension at any point in the converting process. Although only one driven roll 32 is depicted upstream from the converting station 34 (process drum 22 rotates counterclockwise in FIG. 1), it will be understood that a plurality of driven rolls could be provided around the circumference of process drum 22. In some applications, it may be desirable to locate a driven roll upstream and downstream from each converting station to provide isolation of web tension between converting stations.

Each driven roll 32 preferably is driven by the main gear 44 either through a pinion gear mounted on the roll shaft or through one or more intermediate pinion gears, if necessary. Because the driven rolls are geared to the main gear 44 which rotates in synchrony with the process drum 22, the driven rolls 32 rotate at the same speed as the process drum 22. As a result, tension induced in the web prior to the nip between the driven roll 32 and process drum 22 is isolated from the remainder of the converting process downstream from that nip point. That isolation improves registration between converting operations performed around the process drum 22.

Furthermore, tension control and web registration is further enhanced by threading the web such that it maintains contact with the process drum 22 after the initial nip formed by the illustrated driven roll 32 until a point after which all of the converting operations have been completed. That threading, i.e., maintaining contact between the web and process drum 22 from an initial point located upstream from the first converting station until an exit point after the last converting station, is preferred. Alternatively, the web can be threaded around tools located in one or more converting stations, particularly where the web is relatively inelastic and/or has a high tensile strength.

In the preferred embodiment of a rotary converting machine according to the present invention, a plurality of converting stations 34 may be mounted about the circumference of the process drum 22, all but one of which have been removed from FIG. 1 for clarity. One arrangement of additional converting stations is depicted schematically in FIG. 1 as stations A–C, also located about the circumference of process drum 22.

Each converting station 34 could perform any desired converting step including, but not limited to: coating, laminating, die cutting, painting, slitting, sheeting or component placement. The specific tools used in each converting station 34 dictate the converting operation performed at the station. As used in connection with the present invention, it will be understood that "tool" refers to any rolls, coaters, blades, etc. designed to accomplish any desired converting operation.

One skilled in the art will appreciate that not every converting station 34 will perform operations requiring registration with the operations performed by other converting stations located around process drum 22. For example, converting stations which perform slitting or other operations in the web travel direction do not require registration. Furthermore, the first operation on a web which includes a cross-web component will typically establish the points from which registration of succeeding converting operations will be measured.

For example, a first converting operation may die cut one layer of a multilayer web in a controlled-depth die cut operation. A succeeding converting operation may include a second die cut which must be accurately placed relative to the initial die cuts. It is that second converting station at which the registration apparatus of the present invention will be most useful. As a result, a machine according to the present invention may include a plurality of converting stations, at least one of which is a registrable converting station according to the present invention.

As best seen in FIG. 2, each tool 40*a* and 40*b* (referred to collectively as 40) is rigidly attached to a secondary axle (not shown) which is preferably mounted to be substantially parallel to primary axle 48 around which the process drum 22 and helical main gear 44 rotate. In the preferred embodiment, a helical follower gear 52 is rotatably mounted in the converting station 34 to transfer rotary motion of the helical main gear 44 to the tools 40 in the converting station 34.

Figure 3:
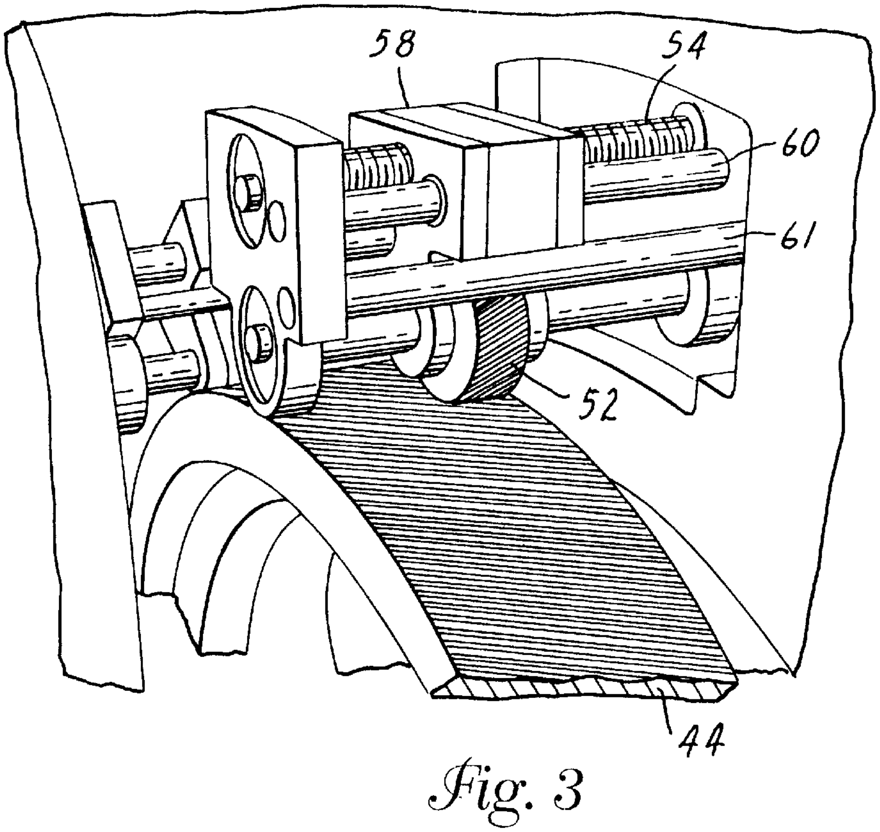
FIG. 3 is an enlarged perspective view of one preferred means for moving the follower gear across the main gear.

In the embodiment depicted in FIGS. 1–3, follower gear 52 is mounted on shaft 50 which allows follower gear 52 to move laterally along shaft 50 while transmitting the rotary motion from helical main gear 44 to the shaft 50. In the preferred embodiment, shaft 50 includes a keyway (not shown) and follower gear 52 includes a key (not shown) which engages the keyway in shaft 50 in a complementary fashion. The keyway and key engage each other such that axial movement of the follower gear 52 along shaft 50 is permitted, but angular rotation of the follower gear 52 relative to the shaft 50 is not permitted. It will be understood that any other mechanism for accomplishing the purpose of allowing lateral motion while transmitting rotary motion could be substituted for the preferred key/keyway combination.

As best seen in FIG. 2, fixed gear 36 is also mounted on shaft 50 but, in contrast to follower gear 52, fixed gear 36 does not move laterally with respect to the tools 40 in converting station 34. Fixed gear 36 transfers rotary motion from the shaft 50 to the tools 40 which are operatively linked to fixed gear 36.

Converting station 34 includes a means for moving the follower gear 52 laterally with respect to helical main gear 44. As best seen in FIGS. 2 and 3, in the preferred embodiment follower gear 52 is moved axially using a truck 58 which partially surrounds helical follower gear 52. Truck 58 is slidably mounted on rods 60 and 61 and includes a threaded bore therethrough for accepting a threaded shaft 54. By rotating threaded shaft 54 (via turn crank 42 in the preferred embodiment), truck 58 and follower gear 52 can be moved laterally (i.e., in the axial direction) across the threaded shaft 54 and rods 60 and 61. Slide rods 60 and 61 help to maintain proper positioning of truck 58 as it moves horizontally (in a direction substantially parallel to shaft 50 and axle 48).

Although a truck 58 is disclosed as the preferred embodiment for imparting axial motion to follower gear 52, those skilled in the art will appreciate that any means for moving follower gear 52 in the axial direction can be substituted.

That relative lateral movement in the axial direction between the helical main gear 44 and follower gear 52 causes a corresponding change in the relative angular positioning between the follower gear 52 and helical main gear 44 due to the angled orientation of the teeth on main gear 44.

Figure 4A:
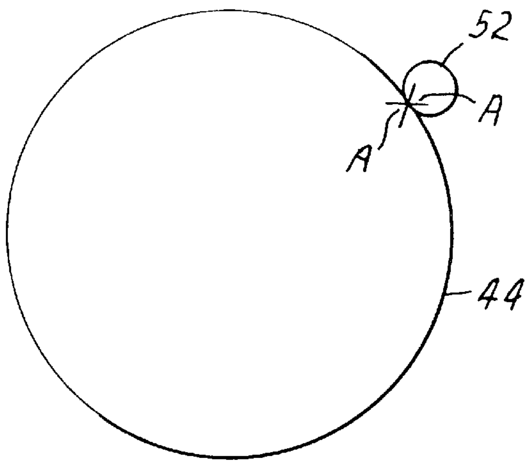
FIGS. 4A & 4B are schematic diagrams illustrating the concept underlying registration adjustment of machines according to the present invention.
Figure 4B:
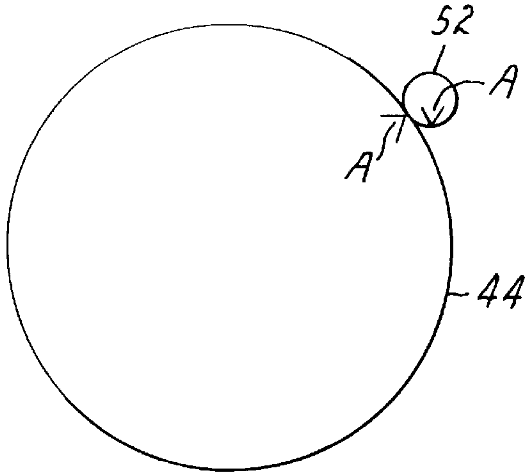

FIGS. 4A and 4B schematically depict the effect of moving follower gear 52 across the face of main gear 44. In FIG. 4A, follower gear 52 and main gear 44 are in one orientation wherein point A on the circumference of follower gear 52 is aligned with a corresponding point A on the circumference of main gear 44. In FIG. 4B, the follower gear 52 can be visualized as having been moved into the page, i.e., away from the viewer. As a result point A on the circumference of follower gear 52 is now offset from point A on follower main gear 44. Any rolls driven by follower gear 52 would also be rotationally offset from their original relationship to main gear 44.

By moving follower gear 52 across the face of main gear 44, the relative rotational positions of the two gears can be adjusted. Because main gear 44 rotates in synchrony with the central process drum 22 (and any web threaded over the drum) and follower gear 52 is used to rotate a driven roll in a converting station, the relative angular relationship between the process drum 22 and any roll driven by follower gear 52 is also adjusted by changing the relative angular relationship between the main gear 44 and follower gear 52.

Figure 5:
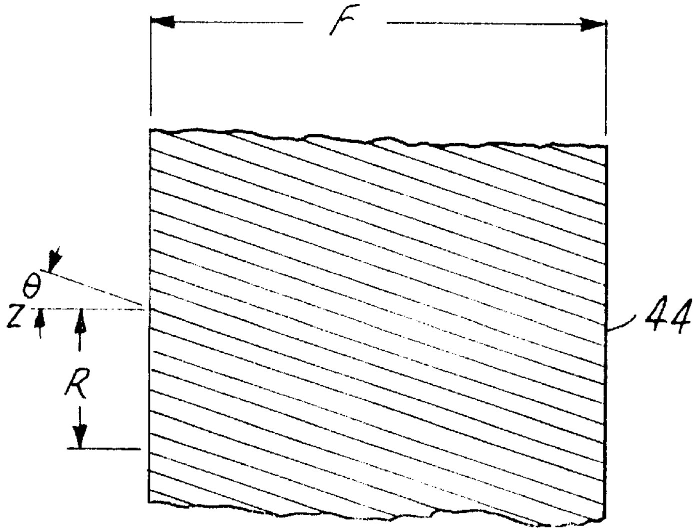
FIG. 5 is a schematic representation of a helical main gear according to the present invention.

The amount of adjustment available between any main gear 44 and follower gear 52 depends upon the width of the face of the main gear 44 as well as the helix angle of the teeth on that main gear 44. FIG. 5 is a schematic representation of a portion of the face of the preferred main gear 44. The axial direction is represented by axis Z while the helix angle is indicated as θ. The distance R is the circumferential difference traveled by a given gear tooth along the circumference of main gear 44. The distance F is the width of the face of main gear 44. When the helix angle θ and the width of gear face F are known, the distance R can be calculated according to the equation below:

$$R=F(\tan\theta)$$

As a result, the helix angle chosen for the main gear 44 and accompanying follower gear 52 can be chosen to provide the desired amount of registration adjustment. It will be understood that if a greater or lesser amount of rotational adjustment is required, the width of the gear face and/or the helix angle can be adjusted as required. In one preferred embodiment, the main gear 44 has a 4" (10.1 cm) face, follower gear 52 has a 1" (2.54 cm) face, and both have a helix angle of 26° relative to the axial direction. It will be understood that any suitable face dimensions and helix angle can be substituted.

As indicated above, the present invention is particularly well suited to convert materials formed using webs which are elastic and/or delicate. Such webs must typically be converted at tension levels which are at or near zero to prevent web breaks and/or puckering due to tension variations in the final product. One product which requires control over tension in the converting process are ACTIVE STRIPS, manufactured by Minnesota Mining and Manufacturing Company, St. Paul, Minn. Other examples of webs which exhibit elastic and/or delicate properties are elastic nonwoven tapes such as, for example, those described in U.S. Pat. Nos. 4,366,814 and 5,230,701. One skilled in the art of converting will understand that many other web materials which must be converted could be advantageously used with the converting machine according to the present invention.

Figure 6:
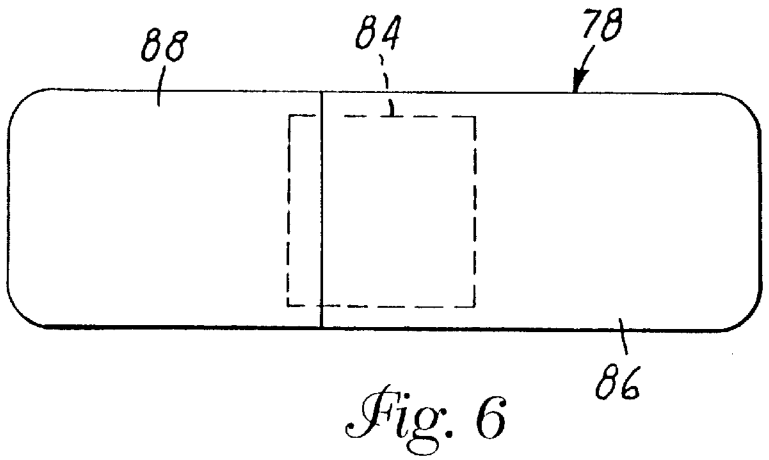
FIG. 6 is a plan view of a bandage produced on a machine according to the present invention.
Figure 7:
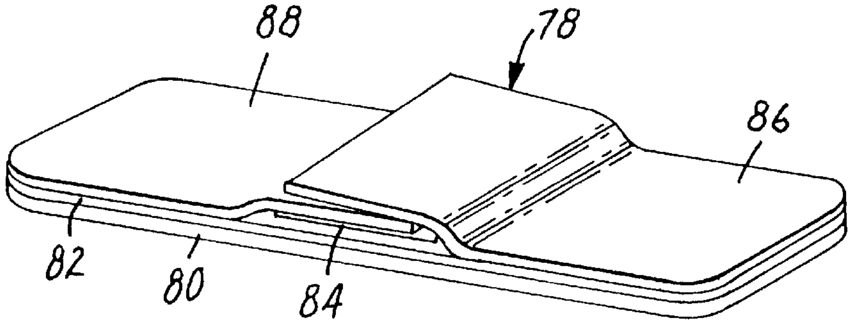
FIG. 7 is a perspective view of the bandage of FIG. 6.

A representative sample of an ACTIVE STRIP, a self-adhesive bandage, is depicted in FIGS. 6 and 7. The bandage 78 includes a substrate layer 80 which is elastic. In the preferred embodiment the substrate 80 is manufactured from a microporous foam pressure sensitive adhesive tape marketed under the trademark MICROFOAM by Minnesota Mining and Manufacturing Company of St. Paul, Minn. The MICROFOAM backing consists of a controlled density polyvinyl chloride chemically blown foam and the preferred adhesive is an acrylic pressure sensitive adhesive.

Bandage 78 includes a layer 82 of pressure-sensitive adhesive which is, in the most preferred embodiment, biocompatible. The bandage 78 also preferably includes an absorbent pad 84 designed to absorb wound exudates such as blood and other fluids. The preferred pads 84 are manufactured from an absorbent fibrous foam or hydrogel pad. Examples of suitable pad materials include gauze and MICROPAD, an absorbent foam pad material marketed by Minnesota Mining and Manufacturing Company of St. Paul, Minn. Those skilled in the art will understand that many other absorbent materials could be used to provide pads 84.

The bandage 78 also preferably includes two liners to protect both the adhesive layer 82 as well as pad 84 from contamination before use. The bottom liner 88 is provided on one side of the bandage 78 and a top liner 86 is provided on the opposite side of the bandage 78. The top liner 86 partially overlies the bottom liner 88 to provide the desired level of protection for pad 84. In addition, in some embodiments the bandage 78 can be provided with a bottom liner 88 which includes a J-fold to facilitate liner removal without contacting the pad 84 and such a fold will be well known to those skilled in the art.

As indicated above, the rotary drum converter of the present invention is particularly well-adapted to produce products such as the bandages 78 depicted in FIG. 6 and 7. The bandages 78 are preferably produced in a web 90 which is depicted in cross section in FIG. 8 before being converted by a sheeting die into the actual bandages 78. The preferred web 90 is formed to produce bandages 78 in a "two-up" configuration, i.e., two bandages are produced adjacent to each other in the transverse web direction. As a result, a single top liner 86 is provided in the center of the web 90 while two bottom liners 88*a* and 88*b* (referred to collectively as 88) are provided on either side of the web 90.

Figure 8:
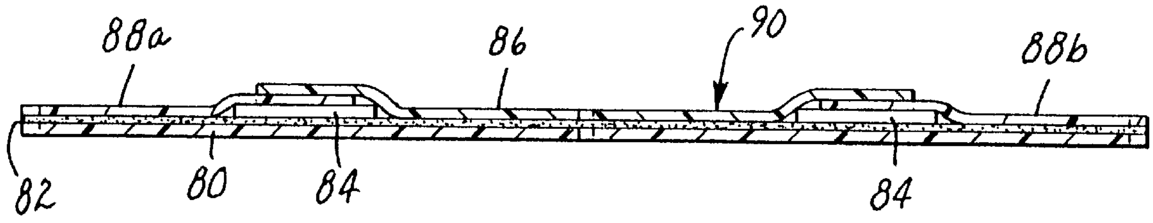
FIG. 8 is a cross-sectional view of the web used to form bandages according to FIGS. 6 and 7.

As shown in the cross sectional view of FIG. 8, the web 90 includes substrate 80 which is elastic, adhesive layer 82 attached to substrate 80 and a pair of pads 84 attached to the adhesive 82. In the center of web 90, top liner 86 is attached to the adhesive layer 82 as well as lying over at least a portion of pads 84 and each of the bottom liners 88. Two separate bottom liners 88*a* and 88*b* are also attached to the outer edges of adhesive 82 and also lie over pads 84 as shown.

Although the cross-sectional view shown in FIG. 8 depicts pads 84, it will be understood that at least portions of web 90 do not include pads 84 as there is preferably a space between the edges of pads 84 and the edges of each bandage 78 as best seen in FIG. 6.

Figure 9:
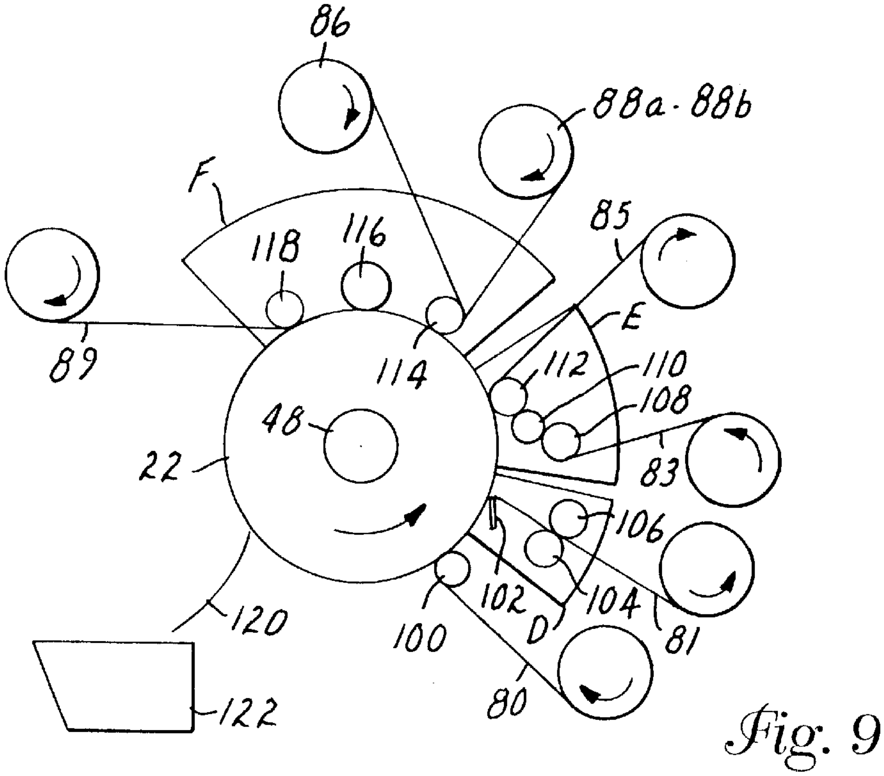
FIG. 9 is a web flow diagram of one converting process on a machine according to the present invention.

FIG. 9 depicts a thread-up diagram of one embodiment of a rotary drum converter according to the present invention for producing a web 90 as depicted in FIG. 8. In accordance with the present invention, all of the converting activities occur around central process drum 22 which is rotating in the direction shown. The converting operations can be separated into three stations indicated as D, E and F located around the circumference of process drum 22.

Converting begins with substrate 80 which is threaded between process drum 22 and nip roll 100. In the preferred embodiment, nip roll 100 is driven to ensure that it is rotating at the same speed as process drum 22. In the preferred method, substrate 80 is provided with adhesive 82 and a liner 81. The liner must be removed from adhesive layer 82 to allow the attachment of pads 84 as well as product liners 86 and 88 as described above.

Due to the elastic nature of substrate 80 as described above, removal of the liner 81 is preferably accomplished at converting station D using a knife edge 102 to isolate the zone in which liner 81 releases from adhesive 82. In the preferred embodiment, liner 81 is threaded through a driven nip formed by rolls 106 and 104, one of which is preferably an elastomeric roll and the other of which is preferably knurled to provide a positive grip on liner 81. It is preferred that one of nip rolls 104 or 106 is driven ultimately by main gear 44 to match the speed of the liner 81 with the speed of web 80. As a result, removal of liner 81 does not induce tension into substrate 80 which would be highly undesirable. The liner 81 is collected on a rewind as shown in FIG. 9.

The actual implementation of knife edge 102 and nip rolls 104 and 106 will be well known to those skilled in the art and will not be described in detail herein.

At the next converting station, i.e., Station E, the material for pads 84 is provided and attached to the adhesive surface 82 on substrate 80. That process is accomplished through the use of a three roll stack using rolls 108, 110 and 112.

Roll 108 is preferably an elastomeric roll which pulls the web 83 from its unwind through the nip formed by roll 108 and anvil roll 110. Anvil roll 110 forms a nip with roll 108 and also preferably acts as a surface against which die roll 112 acts to cut pads 84 from two webs 83 which provide the material for pads 84. In the preferred embodiment, two rows of pads 84 are placed on web 80 to form the "two-up" bandages described above. To reduce waste it is preferable to supply two webs 83, each of which is used to form one row of pads 84.

In the preferred embodiment both anvil roll 110 and die roll 112 are driven from main gear 44 according to the principles of the present invention. As a result, their speed is precisely matched with the speed of the central process drum 22.

Figure 10:
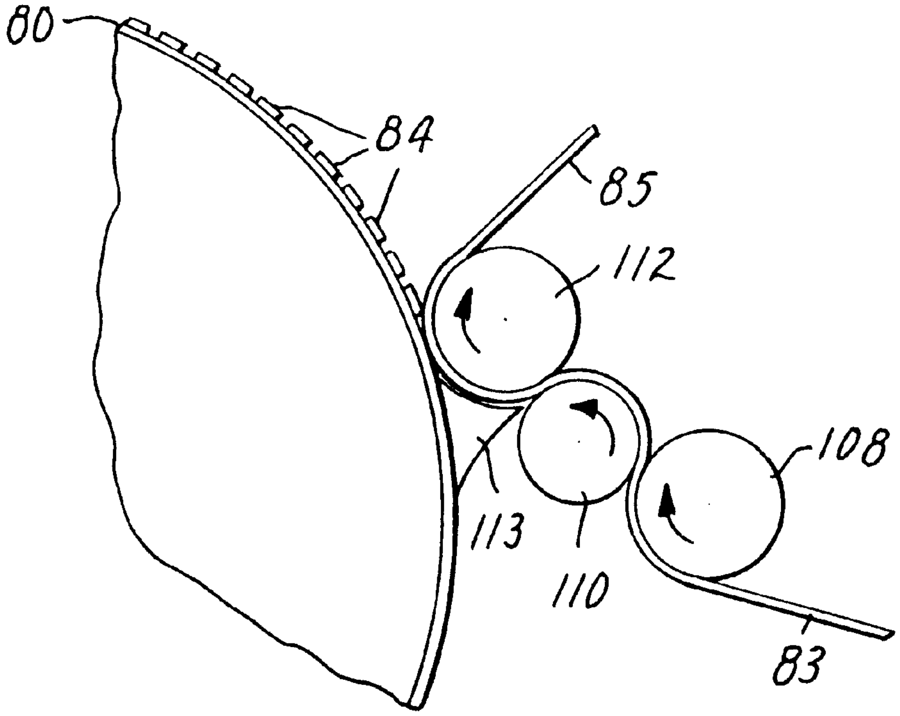
FIG. 10 is an enlarged view of one converting station in FIG. 9.

FIG. 10 depicts an enlarged view of the converting station E depicted in FIG. 10. As shown there a guide 113 is located between anvil roll 110 die roll 112 and central process drum 22. The guide 113 is formed to guide the movement of the individual pads 84 after they have been removed from the web 83 and before they have been applied to the adhesive on substrate 80. Guide 113 does so because its shape matches the radius of the die roll 112 to help retain pads 84 in die cavities 111 on die roll 112 (die cavities are not depicted in FIG. 10 for clarity, refer to FIG. 11) after they have been formed from webs 83.

Figure 11:
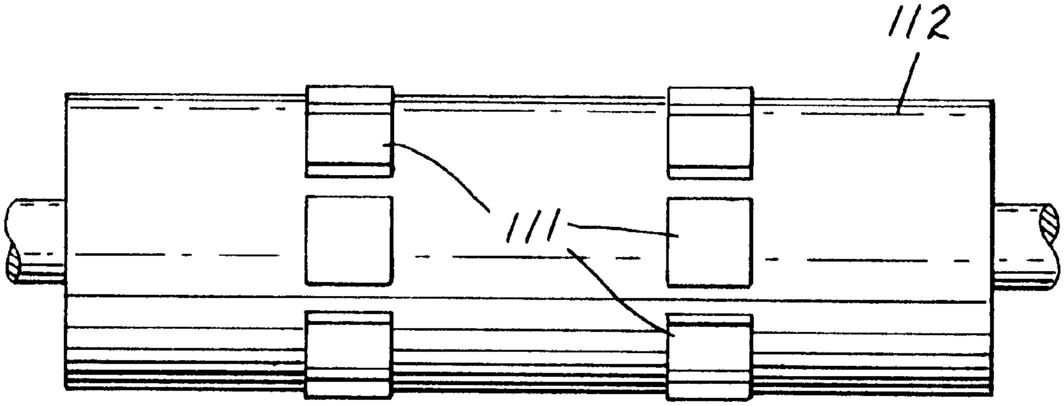
FIG. 11 is an enlarged view of the die roll used in the converting station depicted in FIG. 10.

The die cavities 111 shown in FIG. 11 are preferably lined with a resilient material to assist in transferring pads 84 to the adhesive on substrate 80. The resilient material also ensures that pads 84 release from die cavities 111 and die roll 112. Alternate methods of forming and/or placing pads 84 will be well known to those skilled in the art. Examples include using a vacuum system within cavities 111 to retain the cut pads 84 until placement, or a pick and place apparatus could be used to place pre-formed pads 84 on the substrate 80.

The portions of webs 83 remaining after the pads 84 have been removed are indicated by reference number 85 and are commonly referred to as weeds. The weeds 85 are preferably collected on a rewind stand as shown in FIG. 9 and are later recycled or discarded.

In the most preferred embodiment, the action of converting station E in forming pads 84 is preferably discrete as opposed to continuous. Those skilled in the art will understand the use of clutch mechanisms which advance webs 83 as needed to apply pads 84 at spaced locations along a substrate 80. In such a process, the amount of weed material 85 can be reduced because no material would remain between adjacent pads 84 (in the web travel direction) if this mechanism were used, i.e., the web 83 would advance in discrete steps equal to the length of a pad 84 in the web travel direction.

Turning now to FIG. 12, the thread-up for the top liner 86 and bottom liners 88*a* and 88*b* is shown as enlarged from the view seen in FIG. 9. Substrate 80 is located on process drum 22 (it will be understood with adhesive sides 82 out) and rotating in the direction shown. Substrate 80 includes pads 84 attached to adhesive surface 82 as described above at Station D. Bottom liners 88*a* and 88*b* and top liner 86 are threaded between a nip roll 114 and process drum 22 where they contact the adhesive 82 on substrate 80. By applying pressure at that nip, the webs are joined together to form web 90 as depicted in the cross-sectional view of FIG. 8.

Nip roll 114 is preferably a resilient roll, such as a silicone rubber, having an appropriate durometer. The actual choice of roll material and, if an elastomer, the durometer, will be well known to those skilled in the art.

In the preferred embodiment, nip roll 114 is preferably driven by a series of gears which are ultimately driven by main gear 44 in accordance with the principles according to the present invention. As a result, the speed of nip roll 114 precisely matches the speed of process drum 22, thereby preventing overdriving or underdriving of nip roll 114 which could induce tension into the web 90.

Returning now to FIG. 9, top and bottom liners 86 and 88*a* and 88*b* are threaded between a driven nip roll 114 and central process drum 22. To further prevent tension in the substrate 80, bottom liners 88*a* and 88*b* are preferably unwound from an unwind stand which allows for independent rotation of each of rolls 88*a* and 88*b*.

Figure 13:
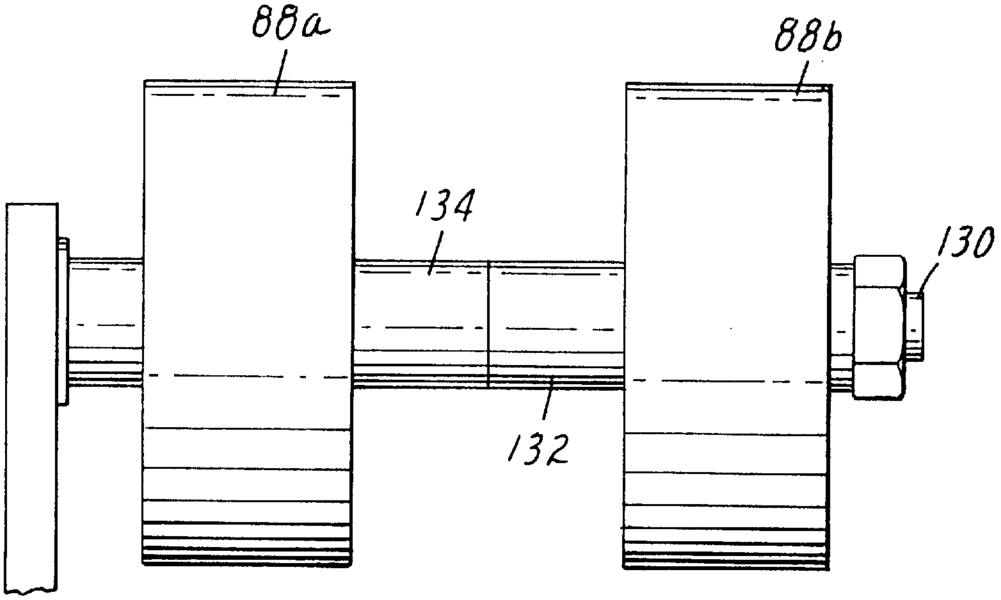
FIG. 13 is a view of one preferred unwind stand for use in the converting process depicted in FIGS. 9 and 12.

A schematic diagram of one preferred unwind stand is depicted in FIG. 13 and includes a shaft 130 which includes two sections 132 and 134 each of which rotate independently. Section 132 is mounted for rotation on an axle and includes a shank portion (not shown) on which section 134 is mounted for independent rotation. The rotation of each section 132 and 134 is operatively connected to a separate braking unit which independently controls tension of each of the webs 88*a* and 88*b*. A more detailed description of this apparatus can be found in the description below and in FIGS. 16 through 22.

Figure 14:
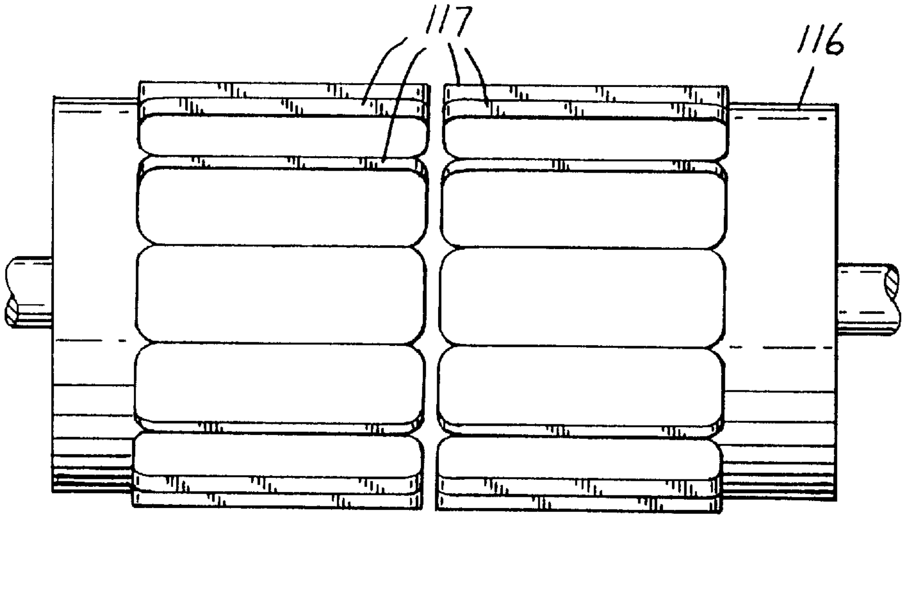
FIG. 14 is an enlarged view of a sheeting die for use in the converting process of FIG. 9.

After top and bottom liners 86 and 88 have been added to web 90 the web is threaded between a nip formed between a sheeting die 116 and central process drum 22. In the preferred embodiment, sheeting die 116 includes a two-up die cavity design which includes die cavities 117 as shown in FIG. 14. The actual spacing of cavities 117 should be matched with the spacing between cavities 111 and die roll 112 used to form and place pads 84 in web 90.

In addition to the tension control useful for converting a product from an elastic substrate such as that described above, the registration control abilities of the present invention are also particularly useful when converting bandage type products as described herein. The registration between die cavities 117 on sheeting die 116 with die cavities 111 on die roll 112 is essential to produce bandages 78 as described in FIGS. 6 and 7. Pad 84 must be centered in the bandage 78 and, as a result, sheeting die 116 must be registered with respect to the placement of pads 84 to achieve that result. In the preferred embodiment, sheeting die 116 is driven from main gear 44 using a follower gear 52 as described above to achieve that registration. It will be understood, however, that either sheeting die 116 or pad die 111 could be capable of registration adjustment in accordance with the principles of the present invention.

In the preferred process an additional nip roll 118 is provided to form a nip with central process drum 22 to isolate tension from the rewind stand 89 which rewinds the weed from the sheeting process performed using sheeting die 116. It is preferred that nip roll 118 is driven to ensure precise speed control to prevent inducing tension into web 90. In some instances, it is also helpful to separate bandages 78 from the weed by wrapping the weed around a relatively small diameter roll.

In one preferred process bandages 78 are then collected in bin 122 using sheet 120 as shown. It is also envisioned that bandages 78 may be introduced directly into a packaging system in line with the converting machine to further enhance production of bandages 78 using a machine according to the present invention. The integration of such equipment will be well known to those skilled in the art and will not be described herein.

FIG. 15 is a schematic diagram depicting a variety of side plates used in converting stations which can be attached to a rotary drum converter 22 according to the present invention. Station G includes side plates which are particularly adapted for converting stations in which a die roll will be acting against a separate anvil roll as opposed to the central process drum.

Side plates 150 include slots 152 and 154 for accepting blocks on which the desired rolls are mounted. It is preferred that one of the slots 152 be oriented substantially radially with respect to the central process drum while the other slot 154 is located at an angle to a radial line extending from the central process drum. As a result, as rolls are advanced within each of slots 152 and 154 they will meet, thereby forming a desired nip point between, for example, an anvil roll and a die roll. One example of a station such as this is depicted as station E in FIG. 9 where it is used to provide the die cutting process for forming pads 84 on bandages 78. In that example anvil roll 110 and die roll 112 are mounted in side plates similar to 150 to provide the desired nip between anvil roll 110 and die roll 112.

Converting station H is an example of a "single" converting station in which a single slot 162 is provided along with a single gear 38*f* which is driven ultimately from the main gear 44. As a result, a roll mounted in side plate 160 can be driven from main gear 44 to provide both speed and registration control as described above.

Converting station I is provided with a side plate 170 which includes two slots 172 and 174 for receiving rolls both of which are driven off a single gear 38*g*. Because both rolls mounted in slots 172 and 174 will be driven by a single gear 38*g*, it will be understood that no registration control can be achieved between those two rolls. Rather, as described above, registration is achieved between stations which operate on separate gears 38 which are attached to separate follower gears 52 along the lines discussed above.

The converting stations described in FIG. 15 are only a few examples of converting stations which can be used around a central process drum 22 in accordance with the principles of the present invention and the invention should not limited to the specific examples described herein.

Figure 16:
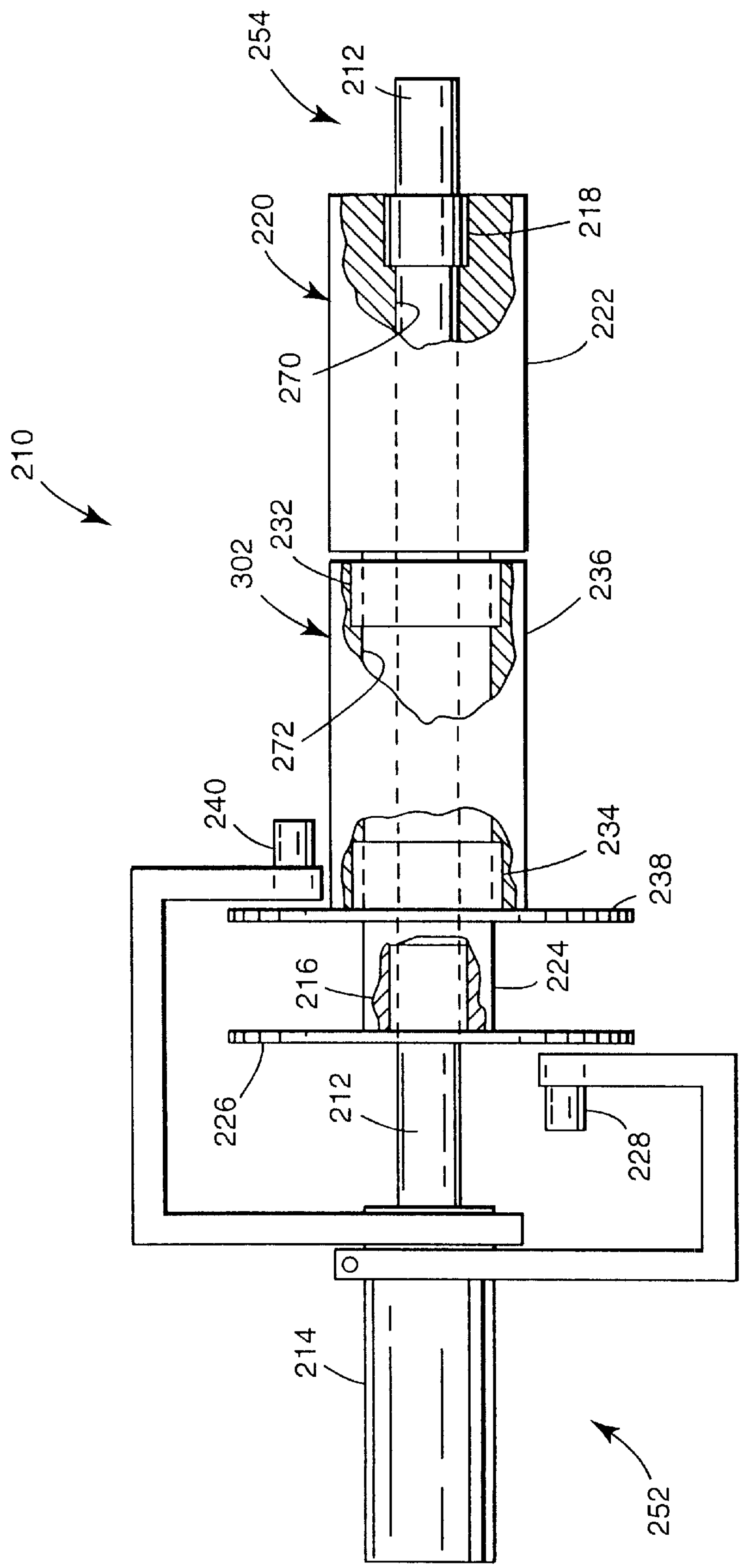
FIG. 16 is a top, partially cut-away view of an exemplary unwind tensioning mechanism according to the present invention.

FIG. 16 illustrates a top view of an exemplary unwind tensioning mechanism 210 useful with the present invention. The mechanism 210 includes shaft 212 having a first end 252 and a second end 254. The first end 252 of shaft 212 extends from a mounting 214 adapted for fixing to any support such as a converting machine commonly known in the art which may require side-by-side dispensing from two different rolls. Such rolls are herein referred to as "supply rolls" because they provide a supply of the indefinite length substrate for processing. Shaft 212 is preferably a rigidly fixed shaft.

Figure 17:
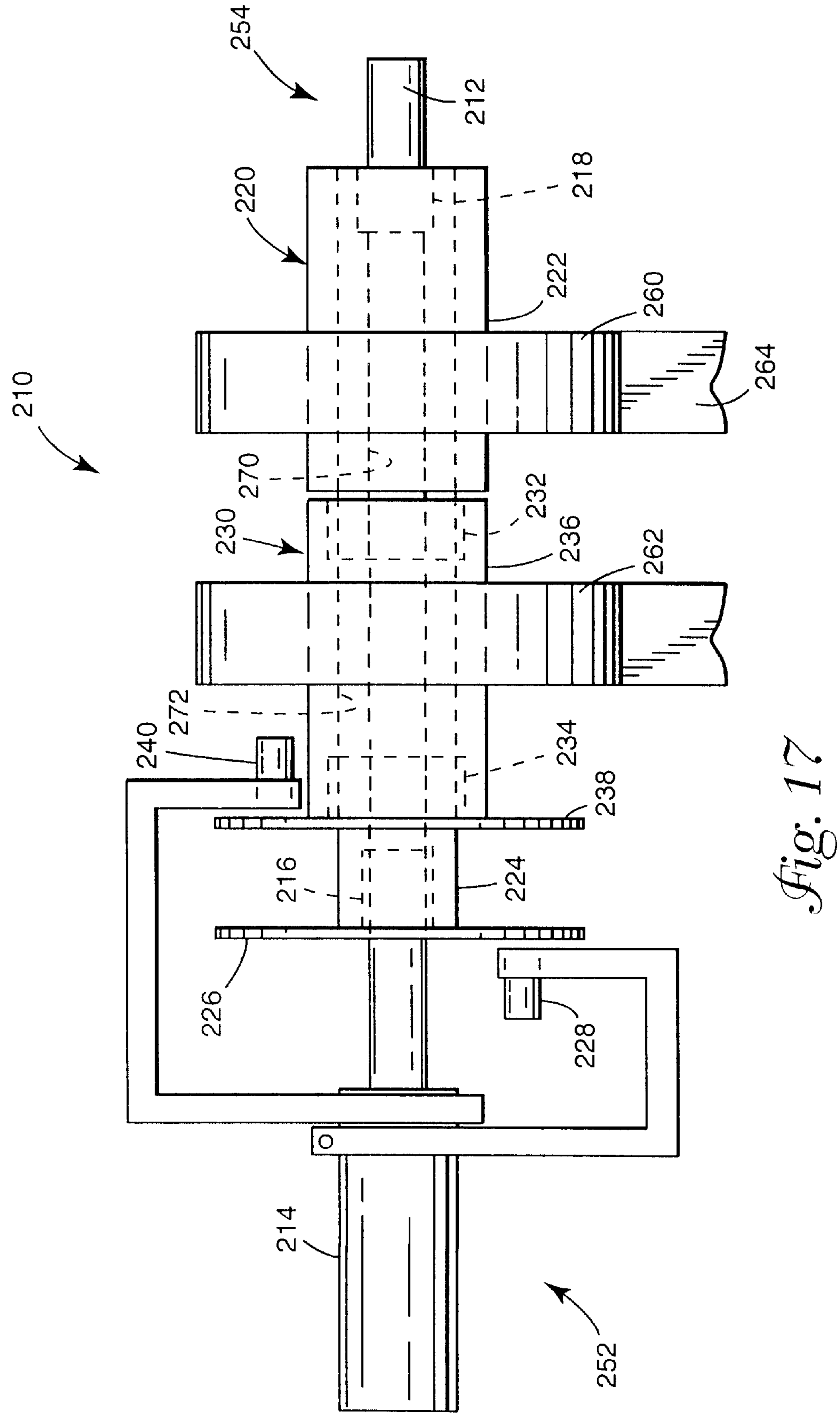
FIG. 17 is a top view of the present invention with two supply rolls mounted thereon.

A first spindle 220 having a longitudinal bore 270 therein receives shaft 212 so as to rotatably mount spindle 220 on roller bearings 216 and 218 on shaft 212. First spindle 220 includes a mounting portion 222, and a shank portion 224. Shank portion 224 of first spindle 220 is mounted proximate the first end 252 of shaft 212. Mounting portion 222 is mounted on shaft 212 proximate the second end 254 of shaft 212. Mounting portion 222 is fashioned to accept a supply roll 260 as shown in FIG. 17. Mounted at the end of the shank portion 224 of first spindle 220 and proximate the first end 252 of shaft 212 is a first brake disk 226. Brake disk 226 is adapted to interact with a first brake actuator 228 to provide a variable resistance to rotation of first spindle 220 about shaft 212. The first brake assembly, comprised of disk 226 and actuator 228, sets and maintains tension on the web substrate 264 being unwound from supply roll 260, which is mounted on the mounting portion 222 of first spindle 220.

FIGS. 16 and 17 show the longitudinal bore 270 in spindle 220 extending throughout the length of spindle 220, with second end 254 of shaft 212 projecting outward from spindle 220. Alternatively, the longitudinal bore of the first spindle may be closed to cover the second end of the shaft. The shank portion of the first spindle is longer than the second spindle.

Figure 18:
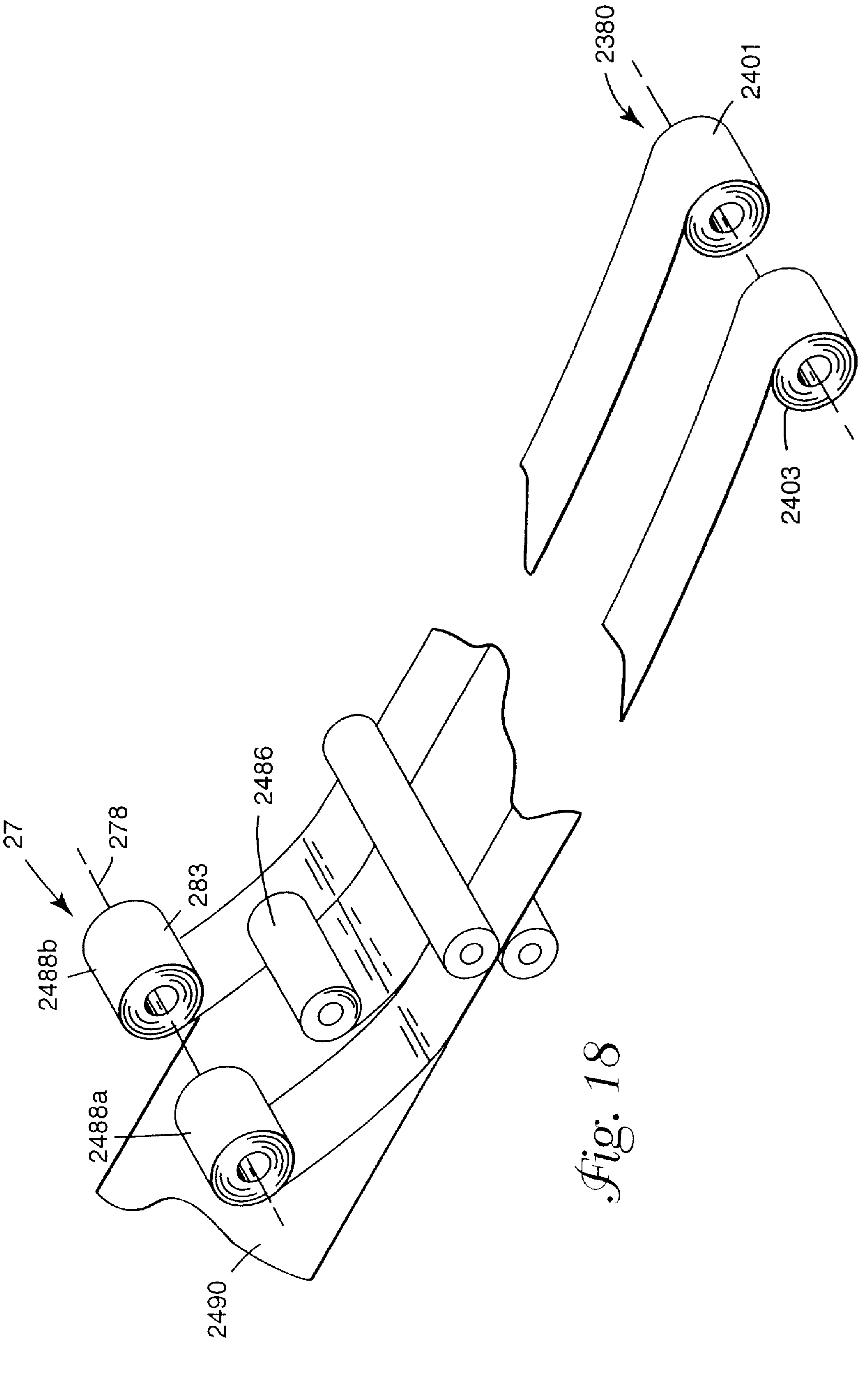
FIG. 18 is a cut away schematic view of a partial converting operation using the present invention.

A second spindle 230 has a central bore 272 therethrough which receives the shank portion 224 of first spindle 220. The second spindle 230 is rotatably mounted on roller bearings 232 and 234 placed directly on the outer surface of the shank portion 224 of first spindle 220. The mounting portion 236 of the second spindle 230 is adapted to accept a second supply roll 262 as shown in FIG. 18. In a preferred embodiment bearing 232 and 234 are at longitudinal or axial positions between bearings 216 and 218 of first spindle to enhance stability of the mechanism. A second brake disk 238 is mounted on the second spindle 230 proximate the first end 252 of shaft 212. The second brake disk 238 interacts with a second brake actuator 240 to provide a variably adjustable resistance to rotation of the second spindle 230 about first spindle 220.

Mounting portion 222 and mounting portion 236 may have equal or unequal outside diameters as suits the intended application.

Both brake assemblies of the invention, 226 and 228, 238 and 240 are located on the same end of the spindles 220 and 230. As shown in FIGS. 16 and 17, both brake assemblies 226 and 228, 230 and 240 are located proximate the first end 252 of shaft 212. This arrangement allows an operator to load and unload supply rolls 260 and 262 from mounting portions 222 and 236 off second end 254 of shaft 212 without disturbing brake assemblies 226 and 228, 238 and 240 or requiring removal of shaft 212 from its mounting. According to the present invention, first and second spindles 220 and 230 are able to freely rotate apart from each other and are separately controlled by the independent brake assemblies allowing each separate brake to exert a different tension on each supply roll. A brake assembly for the first spindle is closer to the first end of the shaft than a brake assembly of a second spindle.

Although FIGS. 16 and 17 illustrate a mechanism of the invention which includes mountings for two supply rolls, one skilled in the art will recognize that a mechanism is easily constructed according to the invention to include more than two supply roll mountings. One such construction would require fashioning second spindle 230 similar to first spindle 220 to include both a mounting portion and a shaft portion so that a third spindle could be mounted on the shaft portion of the second spindle. Additionally, a third brake assembly would be provided to supply an independent tension to the web fed off of the third supply roll mounted on the third spindle. One aspect of this invention is that it allows more than one supply roll to rotate about a common axis.

The mechanism of the present invention could also be used in a tensioned take-up capacity at the end of a converting process or other process requiring a tensioned take-up. This could be accomplished by substituting motors for the brake assemblies. Direct drive gears could be placed on shaft 212 in place of brake disks 226 and 238. Motor gears could actuate the direct drive gears supplying a tensioned wind-up capacity to the present invention. Alternatively, belts or chains placed about spindles 220 and 230 and driven by motors could drive spindles 220 and 230. It is contemplated that motors commercially available as Gast #4AM-FRV-63A from Midwest Machine Tool Supply of Minneapolis, Minn. would be suitable for adapting the present invention for independently controlling the wind-up torque when the invention is used in a take-up capacity. Further, in the unwind application in an alternative to brakes, the tension could be regulated against motors which tolerate a slipping action and generate a predictable torque when so operated.

FIG. 18 illustrates a cut away schematic of a converting process. The converting process shown is typical of the type used to prepare bandages. As shown in FIG. 18, the present invention is used both in the unwind capacity 27 and in the wind-up capacity 2380. Supply roll **2488*a* includes a liner substrate (also referred to as 2488*a*) and supply roll 2488*b* also provides a liner substrate (also referred to as 2488*b*). Supply roll 2486 also provides a liner substrate (also referred to as 2486). As shown in FIG. 18, the present invention allows side-by-side mounting of the supply rolls 2488*a* and 2488*b* on the same axis 278 and allows feeding of the liner substrates into the converting process at virtually the same point. Independently controlled disc brakes supply tension to supply rolls 2488*a* and 2488*b*** to allow exertion of different tensions on each supply roll.

Figure 19:
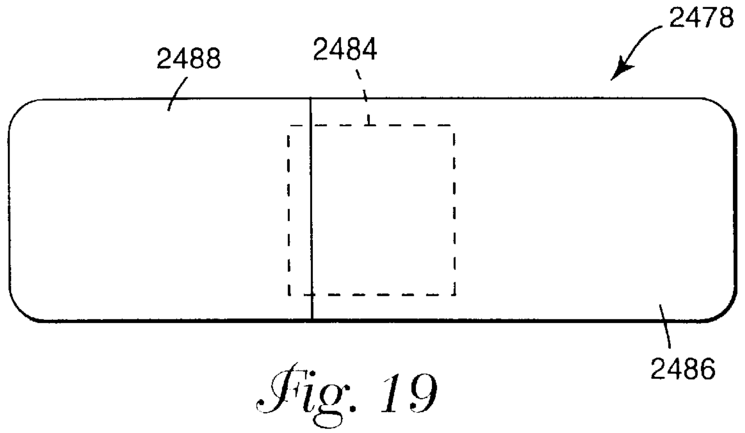
FIG. 19 is a plan view of a bandage.
Figure 20:
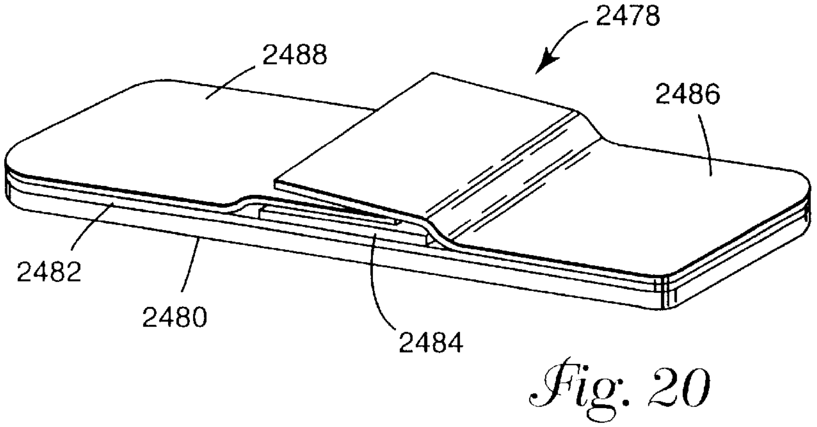
FIG. 20 is a perspective sectional view of the bandage of FIG. 19.
Figure 21:
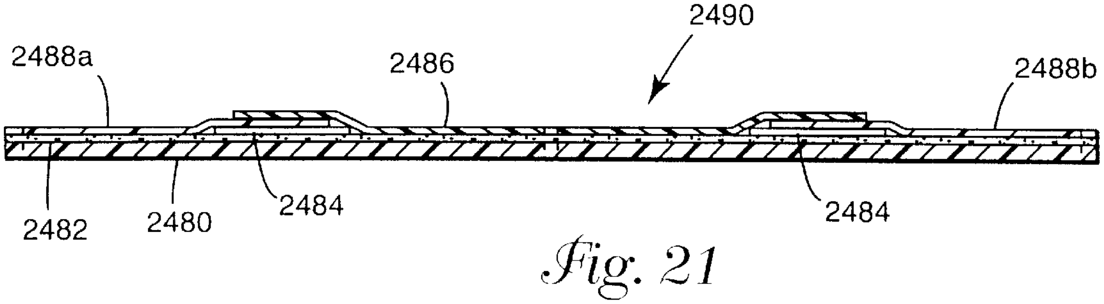
FIG. 21 is a cross-sectional view of two attached bandages of FIG. 20 before slitting to separate the bandages.

FIGS. 19 and 20 illustrate a representative bandage 2478. The bandage 2478 includes a substrate layer 2480, a layer 2482 of pressure-sensitive adhesive and an absorbent pad 2484. The bandage 2478 also preferably includes two liners to protect both the adhesive layer 2482 and the pad 2484 from contamination before use. The bottom liner 2488 is provided on one side of the bandage 2478 and a top liner 2486 is provided on the opposite side of the bandage 2478. The top liner 2486 partially overlies the bottom liner 2488 to provide the described level of protection for pad 2484.

A preferred method of manufacturing such bandages is in a "two-up" configuration, i.e., two bandages are produced adjacent to each other in the transverse web direction. The bandages are depicted "two-up" cross-section in FIG. 8 before being converted by a sheeting die into actual bandages 2478. As a result, a single top liner 2486 is provided in the center of the web 2490 while two bottom liners **2488*a* and 2488*b* (referred to collectively as 2488) are provided on either side of the web 2490. The feeding of these liners 2488*a*, 2488*b* and 2486 into the converting process is depicted in FIG. 18. The cut-away portion of FIG. 18** could include many converting operations useful in manufacturing bandages, e.g., sheeting, slitting and laminating to name a few.

The dual wind-up capacity allows winding of scrap substrate onto take-up roller and the winding of the product onto take-up roller 2403. Rollers 2401 and 2403 are mounted on the same axis 2380. Independently controlled drive motors supply power to rotate the rollers 2401 and 2403.

For the purposes of converting wound dressings, the term "substrate" includes but is not limited to films such as polyurethane films, papers, woven or nonwoven webs. If the present invention is used in a converting process other than for manufacturing wound dressings, the term substrate is defined as any indefinite length material used to manufacture the desired end product as known in the art.

As used herein, "proximate" is used as a relative term such that the shank portion of the first spindle is "proximate" the first end of the shaft if it is closer to the first end of the shaft than the mounting portion of the first spindle.

The present invention has been described above with respect to illustrative examples to which modifications may be made without departing from the scope of the invention as defined by the appended claims.

What is claimed is:

1. A method of manufacturing a medical adhesive bandage comprising:

a) providing a machine for converting a web having an indefinite length into medical adhesive bandages, the machine comprising a helical drive gear operatively attached to a process drum, both the drive gear and the process drum rotating about a primary axis, the machine further comprising a plurality of converting stations circumferentially spaced about the process drum, each converting station comprising a tool acting on a web threaded about the process drum, at least one of the plurality of converting stations further comprising:

1) a registrable tool;

2) a helical follower gear rotating about a secondary axis and operatively attached to the registrable tool, the follower gear engaging the drive gear such that rotation of the drive gear is transferred to the follower gear and then to the registrable tool;

3) means for moving the relative axial positions of the drive gear and follower gear to adjust the relative circumferential relationship between the registrable tool and the process drum; wherein the registrable tool can be registered with respect to rotation of the process drum;

b) threading an elastic substrate in the form of a web having an indefinite length over at least a portion of the process drum, the substrate having a first surface in contact with the process drum and a second surface including an adhesive layer, wherein the tension in the substrate in contact with the process drum is maintained at or near zero;

c) placing a plurality of pads on the adhesive layer at a first of the plurality of converting stations;

d) placing at least one liner in contact with the adhesive layer and over the plurality of pads at a second of the plurality of converting stations; and e) sheeting the substrate and liner to produce a plurality of medical adhesive bandages, wherein each of the bandages includes a backing comprising a portion of the substrate and one of the plurality of pads.

2. A method according to claim 1, wherein each of the bandages includes one pad substantially centered on the backing.

3. A method according to claim 2, wherein the step of sheeting further comprises rotating a sheeting die having at least one die cavity in synchrony with the process drum, and further comprising adjusting registration of the die cavity with respect to the substrate by moving a follower gear across the helical drive gear connected to the process drum.

4. A method according to claim 2, wherein the step of placing a plurality of pads on the adhesive layer comprises placing the plurality of pads on the adhesive layer using a pad die rotating in synchrony with the process drum, and further comprising adjusting registration of the pad die by moving a follower gear across the helical drive gear connected to the process drum.

5. A method according to claim 2, further comprising placing three liners in contact with the adhesive layer, at least two of the liners being unwound from first and second liner supply rolls rotating about a single axis, wherein the first liner supply roll is supported on a first spindle rotatably mounted on a shaft having a first end and a second end, the first spindle comprising a mounting portion and a shank portion, the mounting portion being proximate the second end of the shaft and the shank portion is proximate the first end of the shaft; and further wherein the second liner supply roll is supported on a second spindle rotatably mounted on the shank portion of the first spindle; wherein the method further comprises independently controlling rotation of the first and second supply rolls with first and second controlling means, wherein the first and second controlling means are both mounted proximate the first end of the shaft; whereby the first and second liner supply rolls are removed and replaced from the second end of the shaft.

6. A method according to claim 1, wherein the step of sheeting further comprises rotating a sheeting die having at least one die cavity in synchrony with the process drum, and further comprising adjusting registration of the die cavity with respect to the substrate by moving a follower gear across the helical drive gear connected to the process drum.

7. A method according to claim 6, wherein the step of placing a plurality of pads on the adhesive layer comprises placing the plurality of pads on the adhesive layer using a pad die rotating in synchrony with the process drum, and further comprising adjusting registration of the pad die by moving a follower gear across the helical drive gear connected to the process drum.

8. A method according to claim 6, further comprising placing three liners in contact with the adhesive layer, at least two of the liners being unwound from first and second liner supply rolls rotating about a single axis, wherein the first liner supply roll is supported on a first spindle rotatably mounted on a shaft having a first end and a second end, the first spindle comprising a mounting portion and a shank portion, the mounting portion being proximate the second end of the shaft and the shank portion is proximate the first end of the shaft; and further wherein the second liner supply roll is supported on a second spindle rotatably mounted on the shank portion of the first spindle; wherein the method further comprises independently controlling rotation of the first and second supply rolls with first and second controlling means, wherein the first and second controlling means are both mounted proximate the first end of the shaft; whereby the first and second liner supply rolls are removed and replaced from the second end of the shaft.

9. A method according to claim 1, wherein the step of placing a plurality of pads on the adhesive layer comprises placing the plurality of pads on the adhesive layer using a pad die rotating in synchrony with the process drum, and further comprising adjusting registration of the pad die by moving a follower gear across the helical drive gear connected to the process drum.

10. A method according to claim 9, further comprising placing three liners in contact with the adhesive layer, at least two of the liners being unwound from first and second liner supply rolls rotating about a single axis, wherein the first liner supply roll is supported on a first spindle rotatably mounted on a shaft having a first end and a second end, the first spindle comprising a mounting portion and a shank portion, the mounting portion being proximate the second end of the shaft and the shank portion is proximate the first end of the shaft; and further wherein the second liner supply roll is supported on a second spindle rotatably mounted on the shank portion of the first spindle; wherein the method further comprises independently controlling rotation of the first and second supply rolls with first and second controlling means, wherein the first and second controlling means are both mounted proximate the first end of the shaft; whereby the first and second liner supply rolls are removed and replaced from the second end of the shaft.

11. A method according to claim 1, further comprising placing three liners in contact with the adhesive layer, at least two of the liners being unwound from first and second liner supply rolls rotating about a single axis, wherein the first liner supply roll is supported on a first spindle rotatably mounted on a shaft having a first end and a second end, the first spindle comprising a mounting portion and a shank portion, the mounting portion being proximate the second end of the shaft and the shank portion is proximate the first end of the shaft; and further wherein the second liner supply roll is supported on a second spindle rotatably mounted on the shank portion of the first spindle; wherein the method further comprises independently controlling rotation of the first and second supply rolls with first and second controlling means, wherein the first and second controlling means are both mounted proximate the first end of the shaft; whereby the first and second liner supply rolls are removed and replaced from the second end of the shaft.

12. A method according to claim 1, wherein the process drum comprises a smooth cylindrical outer surface.

13. A method according to claim 1, wherein the machine comprises at least two converting stations of the plurality of converting stations comprise:

1) a registrable tool;
2) a helical follower gear rotating about a secondary axis and operatively attached to the registrable tool, the follower gear engaging the drive gear such that rotation of the drive gear is transferred to the follower gear and then to the registrable tool; and
3) means for moving the relative axial positions of the drive gear and follower gear to adjust the relative circumferential relationship between the registrable tool and the process drum; wherein the registrable tool can be registered with respect to rotation of the process drum.

14. A method of manufacturing a medical adhesive bandage comprising:

a) providing a machine for converting a web having an indefinite length into medical adhesive bandages, the machine comprising a helical drive gear operatively attached to a process drum, both the drive gear and the process drum rotating about a primary axis, the machine further comprising a plurality of converting stations circumferentially spaced about the process drum, each converting station comprising a tool acting on a web threaded about the process drum, at least one of the plurality of converting stations further comprising:
   1) a registrable tool;
   2) a helical follower gear rotating about a secondary axis and operatively attached to the registrable tool, the follower gear engaging the drive gear such that rotation of the drive gear is transferred to the follower gear and then to the registrable tool;
   3) means for moving the relative axial positions of the drive gear and follower gear to adjust the relative circumferential relationship between the registrable tool and the process drum; wherein the registrable tool can be registered with respect to rotation of the process drum;

b) threading an elastic substrate in the form of a web having an indefinite length over at least a portion of the process drum, the substrate having a first surface in contact with the process drum and a second surface including an adhesive layer, wherein the tension in the substrate in contact with the process drum is maintained at or near zero;

c) placing a plurality of pads on the adhesive layer at a first of the plurality of converting stations using a pad die rotating in synchrony with the process drum and adjusting registration of the pad die by moving a follower gear across the helical drive gear connected to the process drum;

d) placing at least one liner in contact with the adhesive layer and over the plurality of pads at a second of the plurality of converting stations; and e) sheeting the substrate and liner to produce a plurality of medical adhesive bandages by rotating a sheeting die having at least one die cavity in synchrony with the process drum and adjusting registration of the die cavity with respect to the substrate by moving a follower gear across the helical drive gear connected to the process drum, wherein each of the bandages includes a backing comprising a portion of the substrate and one of the plurality of pads.

15. A method according to claim 14, further comprising placing three liners in contact with the adhesive layer, at least two of the liners being unwound from first and second liner supply rolls rotating about a single axis, wherein the first liner supply roll is supported on a first spindle rotatably mounted on a shaft having a first end and a second end, the first spindle comprising a mounting portion and a shank portion, the mounting portion being proximate the second end of the shaft and the shank portion is proximate the first end of the shaft; and further wherein the second liner supply roll is supported on a second spindle rotatably mounted on the shank portion of the first spindle; wherein the method further comprises independently controlling rotation of the first and second supply rolls with first and second controlling means, wherein the first and second controlling means are both mounted proximate the first end of the shaft; whereby the first and second liner supply rolls are removed and replaced from the second end of the shaft.

16. A method according to claim 14, wherein each of the bandages includes one pad substantially centered on the backing.

17. A method according to claim 14, wherein the process drum comprises a smooth cylindrical outer surface.

18. A method according to claim 14, wherein the machine comprises at least two converting stations of the plurality of converting stations comprise:

1) a registrable tool;
2) a helical follower gear rotating about a secondary axis and operatively attached to the registrable tool, the follower gear engaging the drive gear such that rotation of the drive gear is transferred to the follower gear and then to the registrable tool; and
3) means for moving the relative axial positions of the drive gear and follower gear to adjust the relative circumferential relationship between the registrable tool and the process drum; wherein the registrable tool can be registered with respect to rotation of the process drum.

* * * * *